United States Patent [19]

Robinsky

[11] 4,194,976

[45] Mar. 25, 1980

[54] GRAVITATIONAL SEPARATOR HAVING MEMBRANE BAFFLES THEREIN

[76] Inventor: Eli I. Robinsky, 66 Lytton Blvd., Toronto, Ontario, Canada

[21] Appl. No.: 891,184

[22] Filed: Mar. 29, 1978

[30] Foreign Application Priority Data

Oct. 5, 1977 [CA] Canada ................................ 288155

[51] Int. Cl.² ............................................. B01D 43/00
[52] U.S. Cl. .................................... 210/137; 210/519; 210/521
[58] Field of Search ............... 210/522, 535, 521, 519, 210/322, 207, 137

[56] References Cited

U.S. PATENT DOCUMENTS

| | | | |
|---|---|---|---|
| 2,879,895 | 3/1959 | McLain | 210/521 |
| 4,056,477 | 11/1977 | Ravitts | 210/519 X |

FOREIGN PATENT DOCUMENTS 17980 of 1890 United Kingdom ..................... 210/521

*Primary Examiner*—Frank A. Spear, Jr.
*Attorney, Agent, or Firm*—George H. Riches and Associates

[57] ABSTRACT

This invention relates to a continuous flow gravitational separator having inclined membrane baffles therein which separates solid particles and also foam from a suspension liquid. A rectangular membrane assembly with a plurality of parallel inclined flexible membranes is received in a cylindrical tank, thereby defining four vertically extending arc-shaped compartments or segments between the membrane assembly and the wall of the tank. The tank has a funnel shaped bottom solids outlet and oppositely located inflow and outflow segments are connected respectively to the liquid inlet and outlet. The liquid flow across the inclined compartments between the membranes is distributed evenly by vertical inflow and outflow distributor plates. The solid particles settle along the inclined membranes to a solids receiving segment, while the foam rises along the membranes to an oppositely located foam receiving segment. Increased membrane slope adjacent the solids and foam receiving segments impedes undesirable currents between these areas and the membrane compartments. The vertical stacking of the inclined lightweight membranes in the cylindrical tank enables a relatively inexpensive compact unit to be provided having a large capacity.

12 Claims, 6 Drawing Figures

GRAVITATIONAL SEPARATOR HAVING MEMBRANE BAFFLES THEREIN

BACKGROUND OF THE INVENTION

This invention relates to apparatus for the separation of solids, liquid and foam such as required in floatation cells and thickeners in the mining industry and more particularly to an inclined membrane separator. In the present invention foam may also be removed from the liquid by floatation. The separation of suspended solid particles from the liquid is effected by the action of gravitational forces causing settlement of the suspended particles. In the past, this natural process has long been used in industry for clarifying water. In its simplest form, an inflow of water is introduced into a tank, suspended particles drop to the bottom where they are collected and removed, and the clear water overflows into a trough outside the upper edge of the tank. It is apparent that the rate of removal of clarified water is dependent, in part, on the horizontal settling area of the tank. The larger the tank, the more clarified water that may be removed. In a further development, instead of increasing the tank size, a more complex system uses stacked metal plates one above the other, each plate acting as a fractional part of the tank bottom, and each adjacent pair of plates normally forming an individual plate compartment. The sum of the projected areas of all the plates is the equivalent total settling area. In order to remove the particles that have settled out on each plate, the plates are inclined, thus enabling the sediment of slide off to a collecting hopper. Such clarifiers are available in industry and are known as lamella gravity settlers, inclined plate clarifiers, or plate separators. Hereinafter all such units will be referred to as settlers.

In these previous continuous operation plate settlers, the efficiency is dependent on the success with which the unit achieves separation of the sediment from the clarified liquid within each plate compartment without allowing the sediment which is sliding along and off each plate to remix with either the clarified liquid or the inflowing suspension. Furthermore, for maximum efficiency the suspension must be supplied equally and uniformly to all plate compartments; similarly the clarified liquid must be removed equally and uniformly from each and every plate compartment. Designs that do not efficiently provide the above requirements result in the necessity of using larger and therefore heavier units containing more settlement plates to make up for lower efficiency. The plates that form the compartments are the primary contributors to the weight and/or cost of the whole unit and the previous apparatus all involve costly, heavy and often complex rigid plate design.

The prior art may be divided into two distinct groups or approaches in the design of continuous operation settlers. In the first group the inflowing suspension, the settling sediment and the clarified liquid all move in a generally parallel direction either upward or downward between the inclined plates forming the plate compartment. The settling sediment can only move in a downward direction and must therefore leave through the bottom of the plate compartment. Because inflow and outflow liquid are involved as well, a second product must also either leave or enter at the bottom of the plate compartment, which creates a complication. For the separation of the two products involved at the bottom of the compartment some designs require complex troughs, secondary plates, feed tubes, drain tubes, and the like, connecting to each and every compartment. Examples of these settlers are described and illustrated in the following patents:

| U.S. | 1,825,550 | Sept. 29, 1931 | J. Schulte |
|---|---|---|---|
|  | 2,077,057 | Apr. 13, 1937 | J. W. Poole |
|  | 2,498,292 | Feb. 21, 1950 | J. J. Naugle |
|  | 2,793,186 | May 21, 1957 | B. A. Dunell et al |
|  | 3,182,799 | May 11, 1965 | M. Krofta |
|  | 3,272,341 | Sept. 13, 1966 | R. T. Hukki |
|  | 3,494,475 | Feb. 10, 1970 | B. Hedstrom et al |
|  | 3,552,554 | Jan. 5, 1971 | G. Olgard |
|  | 3,687,298 | Aug. 29, 1972 | J. Rozkydalek |
|  | 3,754,656 | Aug. 28, 1973 | Horiguchi et al |
|  | 3,886,064 | May 27, 1975 | P. E. Kosonen |
|  | 3,894,955 | July 15, 1975 | B. Forsell |
| Canadian | 956,249 | Oct. 15, 1974 | G. Weijman-Hane |

Other designs attempt to simplify the separation of two of the products by the use of settler plates that contain corrugations, ridges, or other patterns, and may contain punched holes therein as well. Such units are described in the following U.S. Patents:

| 367,308 | July 26, 1887 | W. Macnab et al |
|---|---|---|
| 3,346,122 | Oct. 10, 1967 | J. Cornelissen |
| 3,666,112 | May 30, 1972 | Pielkenrood et al |
| 3,768,648 | Oct. 30, 1973 | Anderson et al |
| 3,813,851 | June 4, 1974 | T. Eder |
| 3,837,501 | Sept. 24 1974 | J. Pielkenrood |
| 3,847,813 | Nov. 12, 1974 | J. L. Castelli |
| 3,849,311 | Nov. 19, 1974 | P. Jakubek et al |
| 3,928,209 | Dec. 23, 1975 | Engdahl et al |
| 4,028,256 | June 7, 1977 | J. Pielkenrood |

Still other settler designs subdivide the plate compartments into tubular units, thereby reducing cross-currents but increasing the complexity of the construction.

| 3,491,892 | Jan. 27, 1970 | C. E. McCann |
|---|---|---|
| 3,615,025 | Oct. 26, 1971 | A. H. Rice et al |
| 3,768,648 | Oct. 30, 1973 | Anderson et al |
| 3,852,199 | Dec. 3, 1974 | Wachsmuth et al |
| 3,898,164 | Aug. 5, 1975 | A. K. Hsiung |
| 3,923,659 | Dec. 2, 1975 | H. Ulrich |
| 3,975,276 | Aug. 17, 1976 | L. A. Schmid |

The second group or approach in the design of settlers includes all cross-flow settlers where the sediment moves and slides generally at right angles to the flow direction of the suspension and clarified liquid. This approach removes the necessity of having to provide special means for separating two of the products at the bottom of the plate compartment as was necessary in the first described category of settlers. Uniform distribution of the inflowing suspension to all plate compartments still remains a problem and attempts are made to solve it by various fixed baffle arrangements, perforated plates, and the like. While representing an improvement over the previous group of settlers, this apparatus remains relatively costly, cumbersome and heavy for large volume applications. Patents illustrating this approach are:

| U.S. | 1,732,386 | Oct. 22, 1929 | M. Sprockhoff |
|---|---|---|---|
|  | 2,119,013 | May 31, 1938 | F.W. Kerns |
|  | 2,868,384 | Jan. 13, 1959 | I.E. Puddington |

| -continued | | |
|---|---|---|
| 3,903,000 | Sept. 2, 1975 | Miura et al |
| Canadian 962,199 | Feb. 4, 1975 | A.B. Turner |

SUMMARY OF THE INVENTION

Accordingly, it is an object of the present invention to at least partially overcome the disadvantages of the prior art settlers by providing apparatus which more closely relates to the above second group of settlers, although it is more appropriately termed a separator in that it may provide for the separation of both solids and foam (gas) from the inflowing liquid suspension, allowing the latter to leave as a clarified liquid.

To this end, in one of its aspects, the invention provides a cross flow gravitational separator having membrane baffles therein to remove suspended solids from a liquid comprising a vertically extending cylindrical tank having liquid inlet, a liquid outlet, and a bottom solids removal outlet; a single vertically extending membrane assembly having a rectangular horizontal cross section, the membrane assembly being received in the cylindrical tank to form separate vertically extending arc-shaped segments between the membrane assembly and the tank wall including an inflow segment in communication with the liquid inlet, an oppositely located outflow segment in communication with the liquid outlet, and a solids receiving segment in communication with the solids removal outlet; a plurality of substantially parallel spaced membranes extending across the membrane assembly, the membranes sloping downwardly towards the solids receiving segment; first liquid flow distributor means located between the inflow segment and the membrane assembly whereby the liquid from the liquid inlet is distributed to flow between the membranes from the inflow segment to the outflow segment, the direction of flow being across the slope of the membranes, and flow restriction means between the solids receiving segment and the interior of the membrane assembly.

The direction of flow through the unit is in a horizontal direction and at right angles to the gravitational movement of the settling particles, thus avoiding the interaction of the settling particles and the flowing liquid. Separator membranes are stretched into position as hereinafter disclosed. Means of separating the solids with the least amount of disturbance are provided by causing them to slide into a quiescent portion of the containment tank through very constricted slots provided at the lower end of the separator membranes. Likewise foam or gases escape through similar constricted slots into another quiescent portion of the containment tank. Furthermore, the containment tank is cylindrical, unlike many of the disclosed systems. A cylindrical tank is a more efficient shape for containing a fluid. The circular walls of the tank are subjected only to tension, whereas rectangular tanks would have to be of heavier plate or be reinforced to withstand bending stresses as well. The lightweight feature of membrane construction allows the separator membranes to be much larger in area than possible with rigid settlement plates that require strength for self-support in conventional settlers. The lightweight feature further allows many more membranes to be installed than would be possible with heavy rigid metal plates. The flexible nature of the membranes further allows restrictions to be provided towards the upper and lower edges of the membranes simply by a change in slope of the stretched membranes. The fact that the inclined membranes are stacked vertically in the cylindrical tank means that the capacity of the unit may be increased by extending upwardly and therefore the unit is economical in floor space, an important feature in industry. Finally, in the preferred embodiment, the inflow and outflow distributor are also comprised of membrane material, designed to be partially adjustable for uniform distribution of the inflowing suspension. The unit as a whole, including the features for separating the foam products, is extremely simple. Although all flow through the unit is laminar and wear of the membranes is not anticipated, all membranes can be readily replaced at low cost. In fact, membrane material, such as rubber, is more resistant to abrasion than, for example, steel plate, and is therefore often used as liner material inside steel pipes.

Further objects and advantages of the invention will appear from the following description taken together with the accompanying drawings.

DESCRIPTION OF THE PREFERRED EMBODIMENTS

Figure 1:
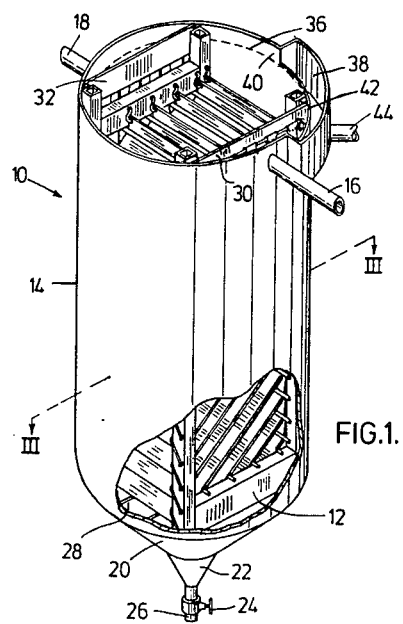
FIG. 1 is a partial cut-away perspective view of a membrane separator according to a preferred embodiment of the invention.
Figure 2:
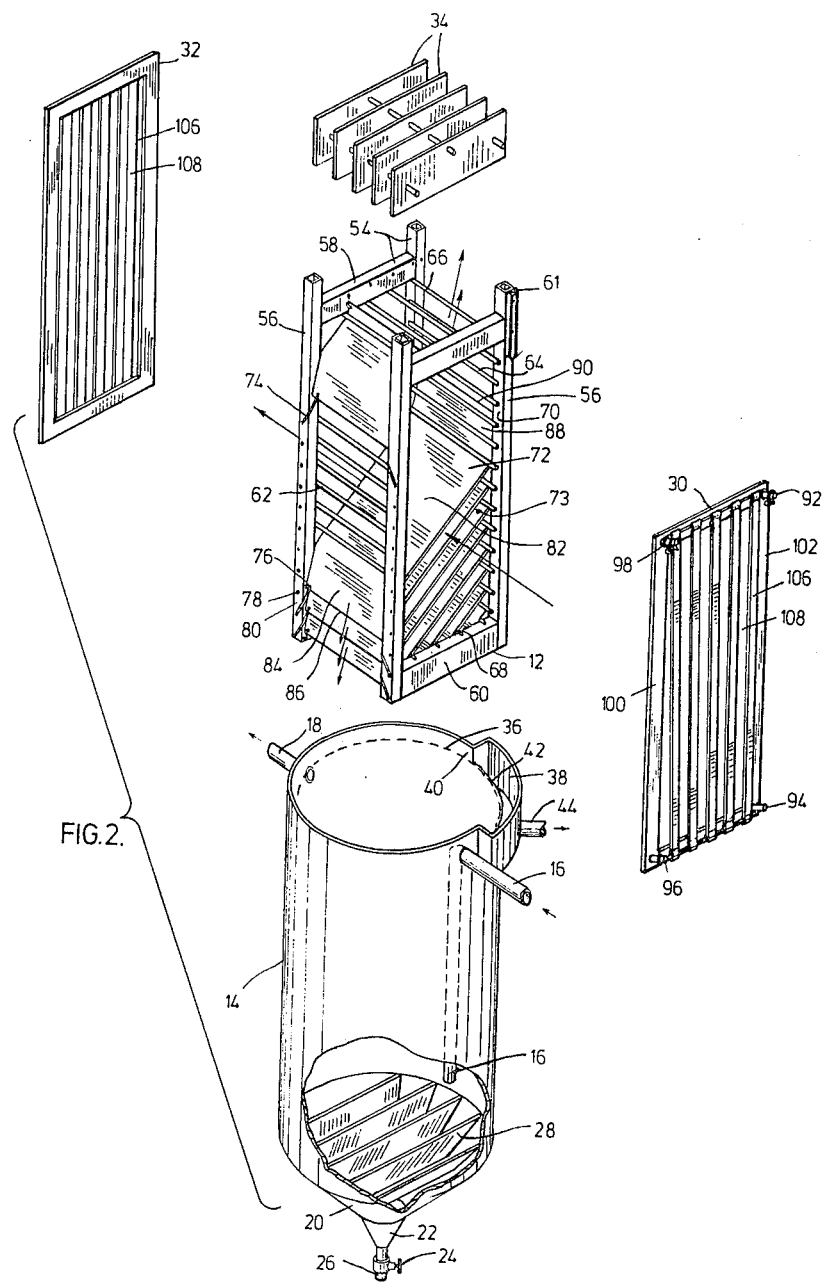
FIG. 2 is an exploded perspective view of the membrane separator seen in FIG. 1.

Reference is first made to FIGS. 1 and 2 which show a continuous flow membrane separator 10 having a membrane assembly 12 received in a cylindrical containment tank 14. The tank 14 has a liquid inlet 16 and a liquid outlet 18 located on opposite sides of the membrane assembly 12. The tank 14 has a bottom hopper cone 20 which, in turn, is fitted with a funnel 22 and suitable piping and a valve 24 to control flow through the solids removal outlet 26. Lower cross baffle plates 28 are set in the hopper cone 20 to support the membrane assembly 12 and to prevent disruptive liquid currents from passing through the hopper cone 20 beneath the membrane assembly. An inflow distributor 30 and an identical outflow distributor 32 are vertically located in the tank 14 on opposite sides of the membrane assembly 12 to distribute the cross liquid flow throughout the membrane assembly 12. Upper cross baffle plates 34 (not shown in FIG. 1) are located above the membrane assembly 12 to direct the flow of foam or gas bubbles which rise to the surface 36 of the liquid in the tank 14 towards a foam receiving trough 38. The trough 38 extends horizontally around a portion of the circumference of the wall 40 of the tank 14 and the foam which overflows into it over lip 42 passes out through foam outlet 44.

Figure 3:
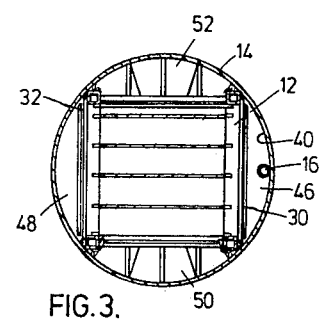
FIG. 3 (shown on page with FIG. 1) is a horizontal sectional view taken along line III—III in FIG. 1.

As may clearly be seen in FIG. 3, the location of the rectangular membrane assembly 12 in the cylindrical tank 14 forms four separate vertically extending arc-shaped compartments or segments between the wall 40 of the tank 14 and the membrane assembly 12. The inflow segment 46 is located adjacent the inflow baffle 30 and receives the suspension liquid from the liquid inlet 16. The outflow segment 48 is located adjacent the outflow baffle 32 and the clarified liquid flows from there out the liquid outlet 18. The solids receiving segment 50 is located on one side of the membrane assembly 12 and the foam receiving segment 52 is located on the other side.

Referring in more detail to the membrane assembly 12, it has two frames 54, each having a pair of vertically extending corner posts 56, and an upper and a lower cross members 58,60. Resilient gaskets 61 are located along the posts 56 to prevent leakage between the tank wall 40 and the posts. The frames 54 are interconnected by a vertical series of horizontally spaced rigid rods 62 adjacent the solids receiving segment and a similar series of spaced rigid rods 64 adjacent the foam receiving segment. Also, a horizontal series of spaced rigid rods 66 interconnect the upper cross members 58 and another horizontal series of spaced rigid rods 68 interconnect the lower cross members 60. As may be seen, the ends of the vertical series of rods 62,64 are secured to the inner sides 70 of the respective corner posts 56. Similarly, the ends of the horizontal series of rods 66,68 are secured to the respective lower and upper sides of the cross members 58,60. A plurality of parallel spaced membranes 72 formed of a flexible material such as sheet rubber extend across the membrane assembly 12 to define a plurality of membrane compartments 73 therebetween. Each membrane 72 is stretched over one of the rods 62 adjacent the solids receiving segment 50 and under one of the rods 64 adjacent the foam receiving segment 52. The membranes 72 are secured to the respective posts 56 by hooks and elastic straps 74 which extend between grommets 76 in the corners of the sheets and openings 78 in the outer sides 80 of the posts 56 and maintain the desired tension on the membranes. As may be seen, the membranes are inclined downwardly toward the solids receiving segment 50 and in the case of the upper or lower membranes, it is necessary to attach them at one edge in a similar manner to either the upper or lower cross members 58,60. Each membrane 72 has a central portion 82 extending between the locating rods and a lower portion 84 between the lower edge 86 and the lower locating rod and an upper portion 88 between the upper edge 90 and the upper locating rod. The central portions 82 of the membranes 72 are inclined to the horizontal at an angle of between 35° and 60°, while the lower and upper portions 84,88 are more steeply inclined than the central portions 82. It is desirable that the spacing between the membranes 72 be a minimum in order to provide the maximum number of membrane compartments 73 in a given volume. The optimum spacing varies with particle size and density and with the liquid, but as an example, it has been found that a spacing of from ½" to 6" between the central portions 82 is suitable for many applications.

Referring in more detail to the inflow and outflow distributors 30,32, four pins 92, 94, 96, 98 are connected to a baffle frame 100. A first elastic stretchable rope 102 is tied to pin 92, passes around pins 94 and 96 and is tied again to pin 98. A second stretchable rope 104 is tied between pins 92 and 98. A plurality of spaced narrow tapered or parallel-sided vertical membrane strips 106 are attached to the horizontal rope segments between pins 92 and 98, and 94 and 96, respectively to define spaces 108 therebetween. By untying the stretchable ropes at both pins 92 and 98, and by either pulling or releasing somewhat the stretchable ropes, the spaces 108 between the vertical membranes may be altered slightly thereby increasing or reducing the flow of liquid through the top or bottom of the membrane assembly, respectively, as required.

In use, the suspension liquid enters the tank 14 by the liquid inlet 16 and is released into the lower portion of the inflow segment 46 of the tank. The very heavy solids sink into the cone 20 from which they slide into funnel 22 and out the solids removal outlet 26 past valve 24. The suspension liquid containing the finer suspended particles is distributed into the membrane compartments 73 by inflow distributor 30. Due to the very low rate of flow through the tank, the solids settle onto and slide down the inclined membranes 72 into the solids receiving segment 50 of the tank from which they also gravitate into the cone 20. The clarified liquid passes on from the membrane compartments 73 through outflow distributor 32 to the outflow segment 48 of the tank and then out the liquid outlet 18 located in the upper portion of the outflow segment 48. Some foam or gasses rise directly to the surface 36 of the liquid in the tank in the inflow segment 46 of the tank. Other foam flows upwardly along the underside of the membranes 72 into the foam receiving segment 52 of the tank. Still other foam rises through to the top of the membrane assembly 12 and is directed by the upper cross baffle plates 34 into the foam receiving segment 52 of the tank. The foam from both the inflow and foam receiving segments 46,52 of the tank then overflows lip 42 into foam receiving trough 38 which extends adjacent to at least a portion of both the inflow and foam receiving segments 46,52. In the preferred embodiment shown, any solids that drop from collapsed foam bubbles while the foam is still in the foam receiving segment 52 will gravitate into the cone 20. If it is desirable to retrieve such solids separately, a vertical baffle (not shown) may be located in the cone 20 beneath the foam receiving segment 52 to separate this portion of the cone from the remainder of the cone. A separate outlet may be installed in this portion of the cone to retrieve these special solids.

It has been found that the stretched membranes do not wrinkle and although they may become slightly concave, the distance between them remains the same and the slight concavity does not hinder the sedimentation process. It has also been found that by a suitable choice of the angle of inclination of the membranes 72, only a small amount of solids is at any one time retained on top of the membranes. Thus the membranes are never overloaded to an extent to hinder their operation. The rate of flow through the membrane assembly 12 is such that substantially all suspended particles settle out before the clarified liquid passes through the outflow distributor 32 and, as pointed out above, the vertical arrangement of the membranes 72 permits a larger capacity unit to be made by making it taller without requiring a larger diameter tank or more floor area. This is also feasible, of course, because of the relative light weight of the unit using the membranes 72 rather than heavy rigid plates. By increasing the slopes of the lower and upper portions 84,88 of the membranes, the exiting spaces between the membranes adjacent the solids and foam receiving segments 50,52 are made considerably narrower than the openings adjacent the inflow and outflow distributors 30,32. In addition, the thickness of the rods which deflect the membranes into the steeper slopes act advantageously to restrict the spaces even further. This narrowing of the spaces between the membranes acts as a hydraulic impediment to the circulation of liquid between the membrane compartments 73 and the solids and foam receiving segments 50,52 of the tank. It is to be noted that the rods do not impede the removal of solids or foam from the membrane compartments 73. The lower rod is located beneath each membrane thus leaving the top surface of the membrane smooth and unimpeded for the sliding solids, and the upper rod is located above the membrane thus leaving the lower surface of the membrane smooth and unimpeded for the egress of the rising foam.

Figure 4:
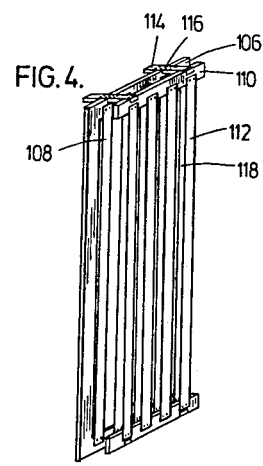
FIG. 4 (shown on page with FIG. 1) is a perspective view of an inflow baffle according to an alternate embodiment.
Figure 5:
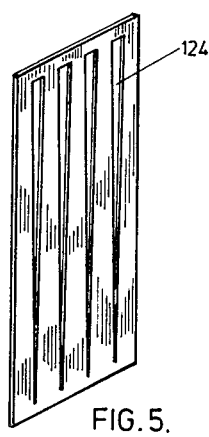
FIG. 5 (shown on page with FIG. 1) is a perspective view of an inflow baffle according to a still further embodiment.

The second embodiment of the inflow distributor 30 shown in FIG. 4 has a first frame 110 with a plurality of spaced vertically extending membrane strips 112 secured thereto. A second frame 114 similarly has a plurality of spaced vertically extending membrane strips 116 secured thereto. The two frames are interconnected at the top and bottom by horizontal members 118, with the distance between them being adjustable by fasteners 120. The membranes in the two frames are horizontally offset and alternate whereby the distributor may be closed by locating the frames in a side by side relationship. Thus a plurality of similar wedge shaped openings may be provided by spacing the frames more at the top than the bottom (or vice versa) to provide the desired flow pattern. A similar distributor would of course, normally be provided for the outflow.

Figure 6:
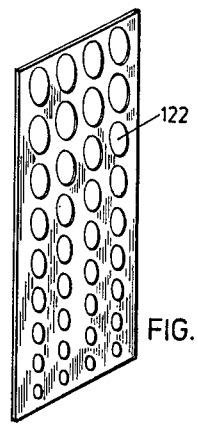
FIG. 6 (shown on page with FIG. 1) is a perspective view of an inflow baffle according to a yet further embodiment.

Similarly the embodiment of the inflow distributor 30 shown in FIG. 6 is a rigid plate with vertical series of varying diameter circular openings 124 therethrough. This would be used with a similar outflow distributor plate with larger holes at the bottom. If non-symmetrical distributors are used, they should be installed so that the larger openings are furthest from the liquid inlet or outlet respectively in order to evenly distribute the liquid cross flow through the membrane compartments.

Although a particular embodiment of this inclined membrane separator has been described and illustrated, it is not to be construed in a limiting sense. Many variations and modifications will now occur to those skilled in the art. For a definition of the invention reference is made to the appended claims.

What I claim is:

1. A cross flow gravitational separator having membrane baffles therein to remove suspended solids from a liquid comprising:
   (a) a vertically extending cylindrical tank having liquid inlet, a liquid outlet, and a bottom solids removal outlet,
   (b) a single vertically extending membrane assembly having a rectangular horizontal cross section, the membrane assembly being received in the cylindrical tank to form separate vertically extending arc-shaped segments between the membrane assembly and the tank wall including an inflow segment in communication with the liquid inlet, an oppositely located outflow segment in communication with the liquid outlet, and a solids receiving segment in communication with the solids removal outlet,
   (c) a plurality of substantially parallel spaced membranes extending across the membrane assembly, the membranes sloping downwardly towards the solids receiving segment,
   (d) first liquid flow distributor means located between the inflow segment and the membrane assembly whereby the liquid from the liquid inlet is distributed to flow between the membranes from the inflow segment to the outflow segment, the direction of flow being across the slope of the membranes, and
   (e) means restricting flow from the membrane assembly to the solids receiving segment.

2. A separator as claimed in claim 1 including a foam receiving vertically extending arc-shaped segment in communication at its upper end with a foam outlet, the foam receiving segment being oppositely located to the solids receiving segment whereby the membranes slope upwardly towards the foam receiving segment.

3. A separator as claimed in claim 2 wherein the membrane assembly includes four vertically extending corner posts each located adjacent the wall of the tank, the pair of posts adjacent the solids receiving segment and the pair of posts adjacent the foam receiving segment each having a vertical series of rigid spaced membrane locating rods extending horizontally therebetween.

4. A separator as claimed in claim 3 wherein the corner posts are rectangular in cross section and the pair of posts adjacent the solids receiving segment each have an inner side facing the foam receiving segment, and the pair of posts adjacent the foam receiving segment each have an inner side facing the solids receiving segment, the ends of the membrane locating rods of each series being secured to the inner side of the respective posts, each membrane being stretched over a locating rod adjacent the solids receiving segment and under a locating rod adjacent the foam receiving segment.

5. A separator as claimed in claim 4 wherein the membranes each have a lower edge adjacent the solids receiving segment and is attached to the pair of posts adjacent the solids receiving segment whereby the lower portion of the membrane between the lower edge and the locating rod over which it is stretched has a greater downward slope than the central portion between the two locating rods, and whereby the effective space between adjacent membranes is reduced adjacent the solids receiving segment.

6. A separator as claimed in claim 4 wherein the membranes each have an upper edge adjacent the foam receiving segment and is attached to the pair of posts adjacent the foam receiving segment whereby the upper portion of the membrane between the upper edge and the locating rod under which it is stretched has a greater upward slope than the central portion between the two locating rods, and whereby the effective space between adjacent membrane is reduced adjacent the foam receiving segment.

7. A separator as claimed in claim 2 wherein the wall of the tank is interrupted by a foam receiving circumferential trough extending horizontally adjacent the top of the membrane assembly, the foam receiving trough being in communication with the input segment and the foam receiving segment, the foam outlet extending from the foam receiving trough.

8. A separator as claimed in claim 7 further including cross baffle means located above the membrane assembly whereby foam rising to the surface of the liquid in the tank is directed into the foam receiving trough.

9. A separator as claimed in claim 1 wherein the flow restriction means comprises membrane slope changing means whereby the downward slope of a portion of each membrane is increased adjacent the solids receiving segment.

10. A separator as claimed in claim 1 further including a second liquid flow distributor means located between the membrane assembly and the liquid outlet.

11. A separator as claimed in claim 10 wherein at least one of the liquid flow distributor means comprises a plurality of spaced membrane strips extending vertically in a common plane, means being provided to slightly vary the spacing between the strips through which the liquid may flow.

12. A separator as claimed in claim 1 wherein the tank has a lower funnel shaped portion extending to the solids removal outlet, the lower funnel shaped portion containing cross baffle means to disrupt liquid flow from the inflow segment and the outflow segment.

* * * * *